No. 729,957. PATENTED JUNE 2, 1903.
M. McBRIDE.
TROLLEY.
APPLICATION FILED APR. 3, 1903.
NO MODEL.

Witnesses:

Inventor,
Miles McBride,
By
Attorneys.

No. 729,957.

Patented June 2, 1903.

UNITED STATES PATENT OFFICE.

MILES McBRIDE, OF BRADDOCK, PENNSYLVANIA.

TROLLEY.

SPECIFICATION forming part of Letters Patent No. 729,957, dated June 2, 1903.

Application filed April 3, 1903. Serial No. 150,861. (No model.)

*To all whom it may concern:*

Be it known that I, MILES MCBRIDE, a citizen of the United States of America, residing at Braddock, in the county of Allegheny and State of Pennsylvania, have invented certain new and useful Improvements in Trolleys, of which the following is a specification, reference being had therein to the accompanying drawings.

This invention relates to certain new and useful improvements in trolleys, the object being to provide a trolley which will not become detached from the wire while the same is in use.

In describing the invention in detail reference is had to the accompanying drawings, forming a part of this specification, and wherein like numerals of reference indicate like parts throughout the several views, in which—

Figure 1:
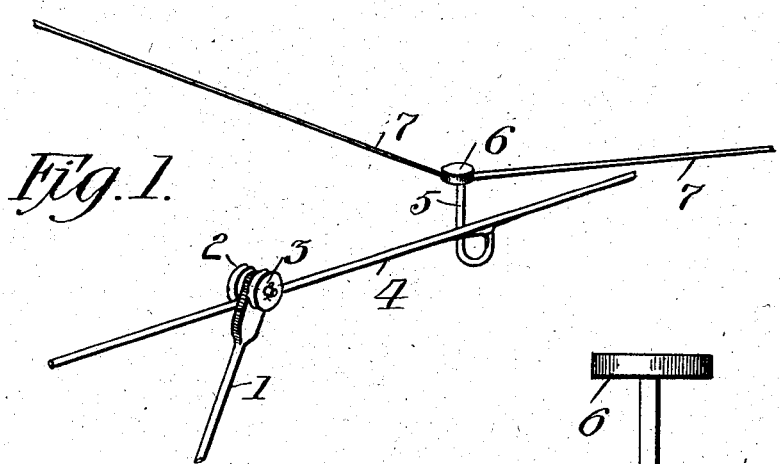
Figure 2:
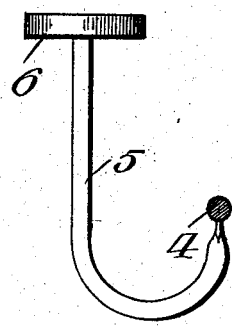
Figure 3:
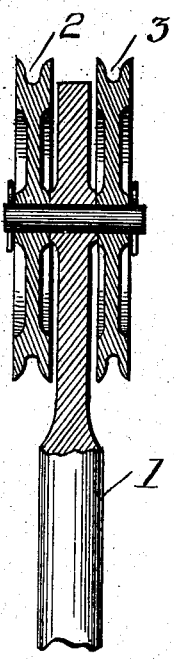

Figure 1 is a view of the upper end of the trolley-pole, showing the trolley-wheels thereon, one of said wheels being connected with the trolley-wire. Fig. 2 shows the trolley-wire support. Fig. 3 is a sectional view of the upper end of the trolley-pole, showing the trolley-wheels attached thereto.

The upper end of the trolley-pole 1 has provided thereon suitably-mounted trolley-wheels 2 3, one of which will be in contact with trolley-wire when moving in either direction. The trolley-wire 4 will be mounted on a suitable J-shaped support 5, the free end of which is attached to the insulator 6, which is connected with and supported by the wires 7 7, the free ends of which are connected to any suitable support. (Not shown.) The trolley-wheels bearing upon the upper end of the trolley-wire, as clearly shown in Fig. 1, will necessitate the trolley-pole having a tendency to move downward instead of upward, as is now the case, when the same is in use. This result may be obtained by any well-known means, either by gravity or suitable means. (Not shown.) While the wheel 2, as shown, is in contact with the trolley-wire 4 in Fig. 1, were the car to be reversed the trolley-pole would be lifted and the wheel 2 disengaged from wire 4. The pole 1 would then be swung around, and the wheel 3 would engage wire 4, thus permitting an opposite direction of the car.

While I have described my invention in detail, it will be obvious that various slight changes may be made in the details of construction without departing from the general spirit of the invention.

Having fully described my invention, what I claim as new, and desire to secure by Letters Patent, is—

1. In a trolley connection for electric vehicles, the combination of a trolley-wire mounted on insulated supports whereby the upper side of the wire presents an even and uniform surface, a trolley-pole on the upper end of which and mounted at either side on suitable pivots trolley-wheels are provided, the said pole having a downward tendency whereby one or the other of the wheels is caused to be in positive contact with the trolley-wire, substantially as described.

2. In a trolley connection for electric vehicles, the combination of a trolley-wire mounted on J-shaped supports the free end of the support being connected with an insulating-block whereby the trolley-wire is insulated from the supports wires which are attached to said block, a trolley-pole having pivotally connected to its upper outside edges trolley-wheels one of which engages the upper surface of the trolley-wire when the pole is depressed, substantially as described.

In testimony whereof I affix my signature in the presence of two witnesses.

MILES McBRIDE.

Witnesses:
H. C. EVERT,
A. M. WILSON.